United States Patent [19]
Izumi

[11] 4,377,107
[45] Mar. 22, 1983

[54] VENTILATION GRILLE STRUCTURE

[75] Inventor: Masao Izumi, Fujisawa, Japan

[73] Assignee: Nissan Motor Company, Limited, Kanagawa, Japan

[21] Appl. No.: 191,131

[22] Filed: Sep. 26, 1980

[30] Foreign Application Priority Data

Nov. 21, 1979 [JP] Japan .......................... 54-160353[U]

[51] Int. Cl.³ ............................................ F24F 13/14
[52] U.S. Cl. ........................................ 98/40 V; 98/2; 98/114
[58] Field of Search ............ 98/2, 40 V, 40 VM, 110, 98/114, 121 A

[56] References Cited

U.S. PATENT DOCUMENTS

| | | | |
|---|---|---|---|
| 2,317,798 | 4/1943 | Otto | 98/40 V |
| 2,395,319 | 2/1946 | Davies | 98/40 VM |
| 3,636,854 | 1/1972 | Cary | 98/121 A |
| 3,662,668 | 5/1972 | Johnson | 98/40 V |
| 3,952,639 | 4/1976 | Nobata | 98/40 VM X |

FOREIGN PATENT DOCUMENTS

| | | | |
|---|---|---|---|
| 2701816 | 7/1978 | Fed. Rep. of Germany | 98/2.16 |
| 2447521 | 8/1980 | France | 98/2.16 |

*Primary Examiner*—Albert J. Makay
*Assistant Examiner*—Harold Joyce

[57] ABSTRACT

A ventilation grille structure comprises an air duct for directing an air flow therethrough, a louver assembly rotatably arranged at the air outlet end of the air duct for forcing the air flow to change its direction while the air flow is passing therethrough. Air guide means is provided in the air duct so as to direct the air flow to the louver assembly without causing turbulences around the air outlet end of the air duct.

1 Claim, 12 Drawing Figures

VENTILATION GRILLE STRUCTURE

FIELD OF THE INVENTION

The present invention relates to a ventilation grille structure, and more particularly to an adjustable air directing grille structure for directing an air flow at variable angles.

STATEMENT OF THE OBJECT OF THE INVENTION

It is an object of the present invention to provide a ventilation grille structure which will eliminate the occurrence of turbulences around the air outlet end of the air duct so as to control the directions of the air flow as desired.

It is another object of the present invention to provide a ventilation grille structure which can eliminate any sources of noises.

SUMMARY OF THE INVENTION

The above objects of the present invention are accomplished by a ventilation grille structure which comprises an air duct for directing an air flow therethrough, and having a pair of spaced parallel side walls, an upper wall connected at its opposite side ends to the upper ends of the side walls, and a lower wall connected at its opposite side ends to the lower ends of the side walls, the side walls and the upper and lower walls forming in combination the air duct having a substantially rectangular internal cross section; a louver assembly comprising a louver frame having a pair of side wall portions facing the side walls of the air duct and rotatable about an axis fixed with respect to the air duct and substantially parallel with and spaced apart from the upper and lower walls of the air duct, an upper wall portion connected at its opposite side ends to the upper ends of the side wall portions and facing the upper wall of the air duct and a lower wall portion connected at its opposite side ends to the lower ends of the side wall portions and facing the lower wall of the air duct; air guide means comprising upper and lower air guide plates respectively having widths substantially equal to the widths of the upper and lower wall portions of the louver frame, the upper air guide plate having one longitudinal end hingedly connected to the upper wall portion of the louver frame and the lower air guide plate having one longitudinal end hingedly connected to the lower wall portion of the louver frame; and contact-holding means for holding the upper and lower air guide plates in slidable contact at their other longitudinal ends with respective inner faces of the upper and lower walls of the air duct.

BRIEF DESCRIPTION OF THE DRAWINGS

The features and advantages of the ventilation grille structure according to the present invention will be more clearly understood from the following detailed description taken in conjunction with the accompanying drawings, in which.

DESCRIPTION OF THE PRIOR ART

Figure 1:
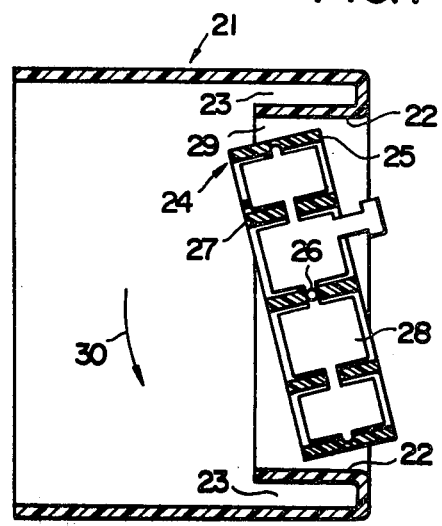
FIG. 1 is a cross sectional view of a conventional ventilation grille structure.

There have been known various types of ventilation grille structures, one of which is shown in FIG. 1. The ventilation grille structure comprises an air duct 21 having a pair of spaced parallel turned-back end portions 22 forming an air outlet end and dead pockets 23, and a louver assembly 24 having a louver frame 25 rotatable about an axis 26, a plurality of horizontal fixed slats 27 spaced apart in parallel from each other and secured at their opposite side ends to the louver frame 25, and a plurality of vertical turnable fins 28 substantially perpendicular to the fixed slats 27 and turnably connected to the louver frame 25. A flow of air admitted into the air duct 21 can be forced to change its direction while passing through the louver assembly 24. In this type of grille structure, there is formed an upper dead space 29 which is enlarged as the louver assembly 24 is inclined from its upright position for example in a direction indicated by arrow 30 in FIG. 1. The upper dead space 29 and the dead pockets 23 cause turbulences when the air flow arrives at the turned-back end portions 22 of the air duct 21, giving rise to a decrease in the velocity of the air flow. This makes it impossible to control the direction of the air flow as desired. Moreover, the turbulences of the air flow tend to be sources of noises.

Figure 2:
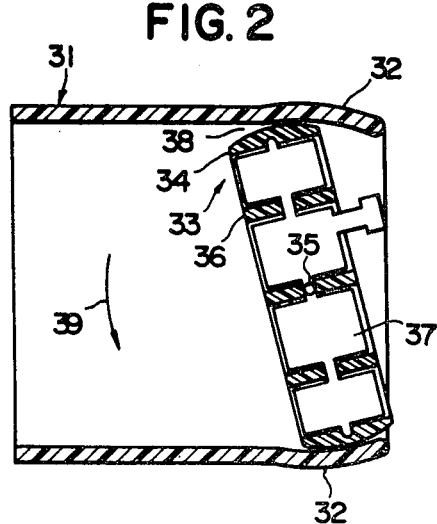
FIG. 2 is a cross sectional view of another conventional ventilation grille structure.

Another type of known ventilation grille structure is shown in FIG. 2. The ventilation grille structure herein shown comprises an air duct 31 having outwardly bulged portions 32 forming an air outlet end, and a louver assembly 33 having a louver frame 34 which has upper and lower wall portions shaped conformingly to the bulged portions 32 of the air duct 31 and which is rotatable about an axis 35, a plurality of horizontal fixed slats 36 spaced apart in parallel from each other and secured at their opposite side ends to the louver frame 34, and a plurality of vertical turnable fins 37 substantially perpendicular to the fixed fins 36 and turnably connected to the louver frame 34. This type of grille structure also forms an upper dead space 38 which is enlarged as the louver assembly 33 is inclined from its upright position for example in a direction indicated by arrow 39 in FIG. 2. For the reasons explained in respect of the prior-art grille structure shown in FIG. 1, the upper dead space 38 not only makes it impossible to properly control the flow of air as desired but tends to be sources of noises.

DESCRIPTION OF THE PREFERRED EMBODIMENTS

Figure 3:
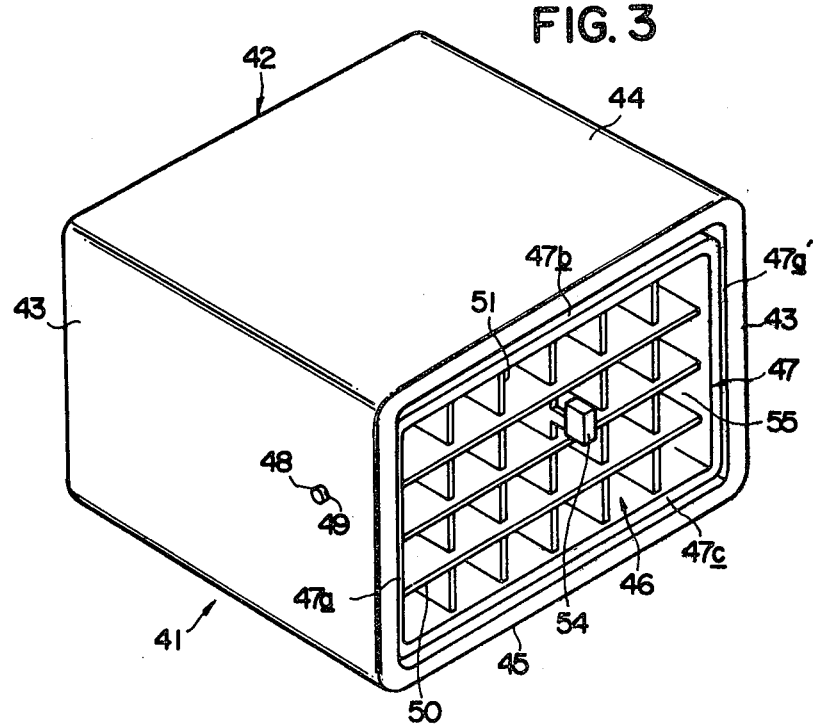
FIG. 3 is a perspective view of a first embodiment of the ventilation grille structure according to the present invention.
Figure 4:
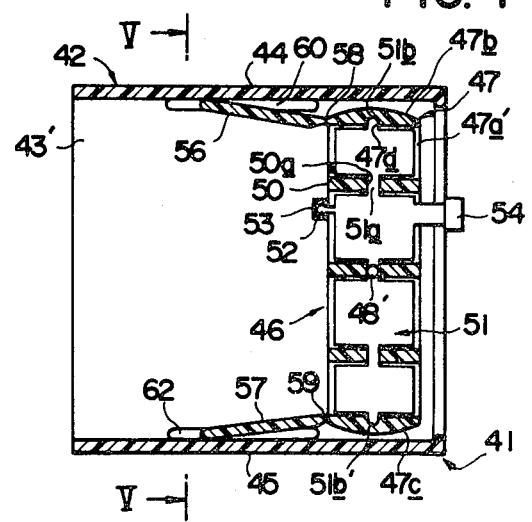
FIG. 4 is a cross sectional view taken along the longitudinal axis of the ventilation grille structure illustrated in FIG. 3.
Figure 5:
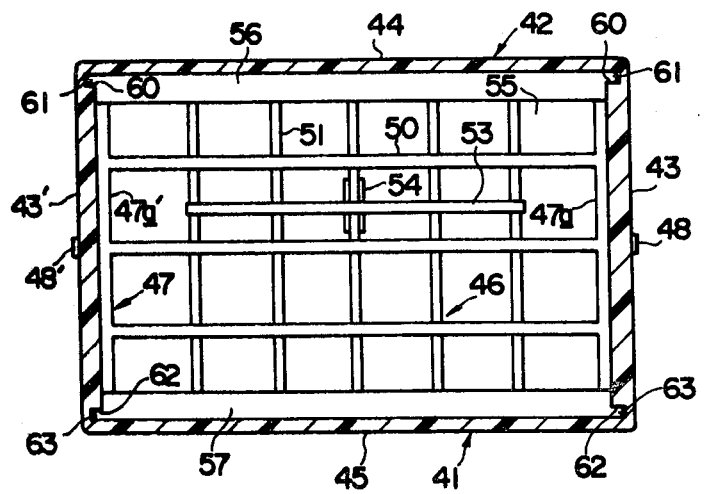
FIG. 5 is a cross sectional view of the ventilation grille structure illustrated in FIG. 3 and taken along line V—V of FIG. 4.

Turning to FIGS. 3 to 5, the first embodiment of the ventilation grille structure according to the present invention is in its entirety indicated by reference numeral 41. The ventilation grille structure 41 comprises an air duct 42 for directing an air flow therethrough, and which has a pair of spaced parallel side walls 43 and 43', an upper wall 44 connected at its opposite side ends to the upper ends of the side walls 43 and 43', and a lower wall 45 connected at its opposite side ends to the lower ends of the side walls 43 and 43'. The side walls 43 and 43', the upper wall 44, and the lower wall 45 form, in combination, the air duct 42 having a substantially rectangular internal cross section. Generally designated at 46 is a louver assembly which comprises a louver frame 47 having a pair of side wall portions 47a and 47a' facing the side walls 43 and 43', respectively, of the air duct 42, an upper wall portion 47b connected at its opposite side ends to the upper ends of the side wall portions 47a and 47a', and a lower wall portion 47c connected at its opposite side ends to the lower ends of the side wall portions 47a and 47a' and facing the lower wall 45 of the air duct 42. A pair of trunnions 48 and 48' extend in axial alignment with each other and project sidewise outwardly from the side portions 47a and 47a' of the louver frame 47 so as to be rotatably received in bores 49, respectively. The louver frame 47 can thus be rotatable about an axis fixed with respect to the air duct 42, substantially parallel with and spaced apart from the upper and lower walls 44 and 45 of the air duct 42 and axially coincident with the respective center axes of the trunnions 48 and 48'. The louver assembly 46 further comprises a plurality of horizontal fixed slats 50 integrally connected at the side ends thereof to the side wall portions 47a and 47a' of the louver frame 47 substantially in parallel to and at spacings from the upper and lower wall portions 47b and 47c of the louver frame 47, and a plurality of vertical turnable fins 51 each having a plurality of fin sections which are connected together by bridge portions 51a spacedly formed along the longitudinal direction of the turnable fin 51. Each of the fins 51 further has upper and lower protrusions 51b and 51b' formed at the upper and lower ends of the fin. The upper and lower protrusions 51b and 51b' are pivotally received in holes 47d and 47d' formed in the upper and lower wall portions 47b and 47c, respectively, of the louver frame 47. The bridge portions 51a are turnably passed through bores 50a formed in the fixed slats 50 of the louver frame 47, with the result that the turnable fins 51 are supported on the upper and lower wall portions 47b and 47c of the louver frame 47 and the fixed slats 50 and are turnable with respect to the louver frame 47 about axes substantially normal to the horizontal fixed slats 50. The turnable fins 51 have formed at their rear ends spherical joint portions 52 slidably received in a horizontal connecting rod 53 which thus connects the fins 51 together, and a handle 54 is integrally formed at the foremost end of the longitudinally intermediate fin section of one of the vertical turnable fins 51. When the particular one of the turnable fins 51 is turned by the handle 54, all the turnable fins 51 are simultaneously turned with respect to the louver frame 47 about the axes substantially normal to the horizontal fixed slats 50 by means of the horizontal connecting rod 53. The fixed slats 50 and the turnable fins 51 define in combination a plurality of compartments 55 through which a flow of air is to pass.

The ventilation grille structure 41 further comprises air guide means which is operative to guide a flow of air into the individual compartments 55 formed by the fixed slats 50 and the turnable fins 51 without causing turbulences in the air duct 42 in the vicinity of the louver assembly 46. The air guide means is shown comprising upper and lower air guide plates 56 and 57 which respectively have widths substantially equal to the widths of the upper and lower wall portions 47b and 47c of the louver frame 47. The louver assembly 46 and the upper and lower air guide plates 56 and 57 are integral with each other and constructed of a synthetic resin forming a pair of thinned, pliable strip portions 58 and 59 between the upper air guide plate 56 and the upper wall portion 47b of the louver frame 47 and between the lower air guide plate 57 and the lower wall portion 47c of the louver frame 47. It is thus to be noted that the upper air guide plate 56 is hingedly connected at one longitudinal end thereof to the upper wall portion 47b of the louver frame 47 by the strip portion 58, while the lower air guide plate 57 is hingedly connected at one longitudinal end thereof to the lower wall portion 47c of the louver frame 47 by the strip portion 59.

Figure 6:
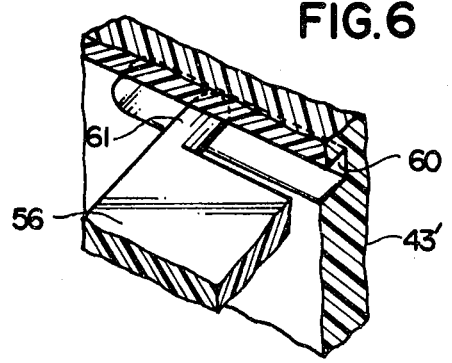
FIG. 6 is a fragmentary perspective view showing, to an enlarged scale, portions of contact-holding means which form part of the embodiment of FIGS. 3 to 5.

The ventilation grille structure 41 further comprises contact-holding means which is operative to hold the upper and lower air guide plates 56 and 57 in slidable contact at their other longitudinal ends with the respective inner faces of the upper and lower walls 44 and 45 of the air duct 42. The contact-holding means comprises portions of the side walls 43 and 43' which are formed with a pair of upper guide grooves 60 extending longitudinally of the air duct 42 and having respective upper ends substantially flush with the inner face of the upper wall 44 of the air duct 42, and a pair of upper guide pins 61 sidewise outwardly projecting in opposite directions from the longitudinal ends of the upper air guide plate 56 and slidably received in the upper guide grooves 60, respectively. The upper guide groove 60 and the upper guide pin 61 are illustrated to enlarged scales in FIG. 6. The contact-holding means further comprises portions of the side walls 43 and 43' which are similarly formed with a pair of lower guide grooves 62 extending longitudinally of the air duct 42 and having respective lower ends substantially flush with the inner face of the lower wall 45 of the air duct 42, and a pair of lower guide pins 63 sidewise outwardly projecting in opposite directions from the longitudinal ends of the lower air guide plate 57 and slidably received in the lower guide grooves 62, respectively.

Figure 7:
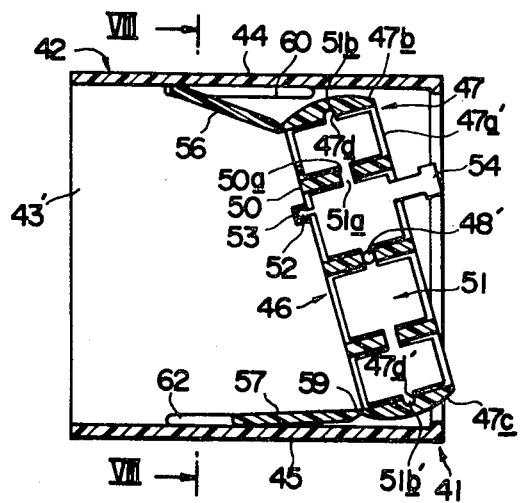
FIG. 7 is a cross sectional view of the ventilation grille structure similar to FIG. 4 but showing a louver assembly inclined from its upright position.
Figure 8:
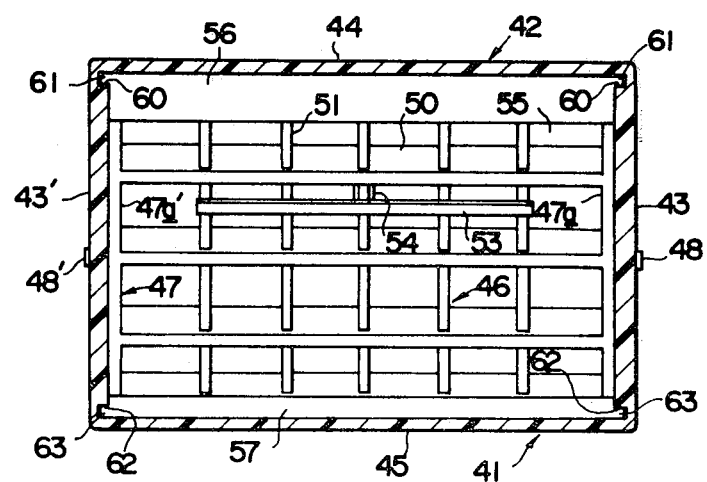
FIG. 8 is a cross sectional view of the ventilation grille structure illustrated in FIG. 7 and taken along line VIII—VIII of FIG. 7.

In this embodiment of the ventilation grille structure 41 according to the present invention, an air flow admitted into the air duct 42 can be forced to change its direction in the louver assembly 46 by inclining the louver assembly 46 at an appropriate angle from its upright position and by manipulating the handle 54 for turning the turnable fins 51 through an appropriate angle as will be seen from FIGS. 7 and 8. In this instance, the air flow is guided and directed by the upper and lower air guide plates 56 and 57 into the compartments 55 without producing turbulences in the air duct 42 in the vicinity of the louver assembly 46.

Figure 9:
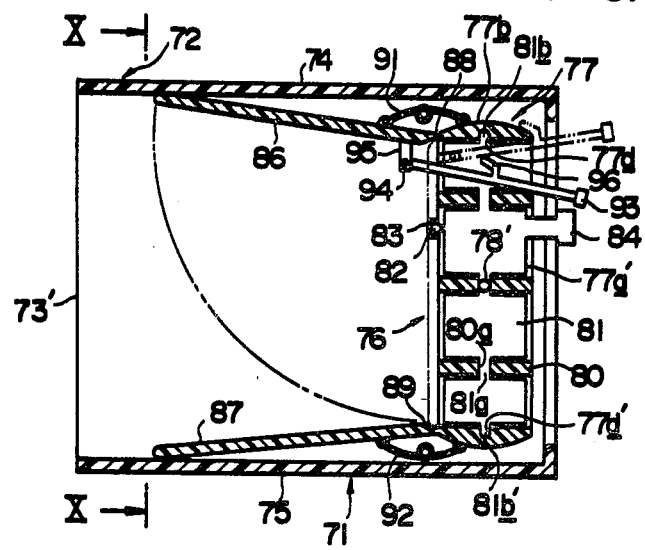
FIG. 9 is a cross sectional view of a second embodiment of the ventilation grille structure according to the present invention.
Figure 10:
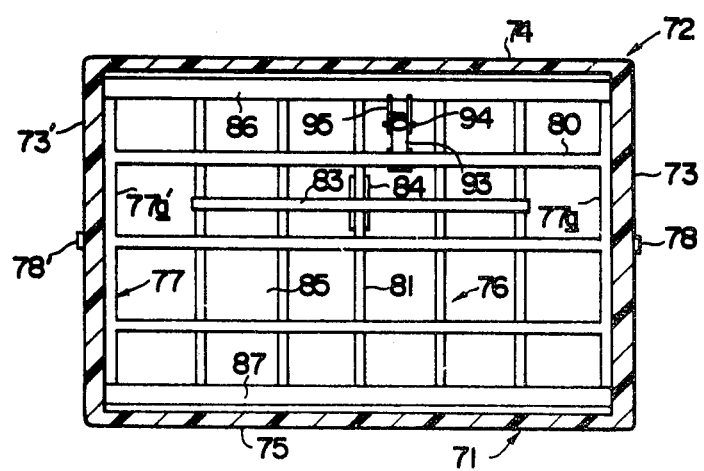
FIG. 10 is a cross sectional view of the ventilation grille structure illustrated in FIG. 9 and taken along line X—X of FIG. 9.

The second embodiment of the ventilation grille structure according to the present invention is shown in FIGS. 9 and 10 and is generally indicated by reference numeral 71. The ventilation grille structure 71 comprises an air duct 72 which has a pair of spaced parallel side walls 73 and 73', an upper wall 74 connected at its opposite side ends to the upper ends of the side walls 73 and 73', and a lower wall 75 connected at its opposite side ends to the lower ends of the side walls 73 and 73'. The side walls 73 and 73', the upper wall 74, and the lower wall 75 form in combination the air duct 72 having a substantially rectangular internal cross section. Generally designated at 76 is a louver assembly which comprises a louver frame 77 having a pair of side wall portions 77a and 77a' facing the side walls 73 and 73', respectively, of the air duct 72, an upper wall portion 77b connected at its opposite ends to the upper ends of the side wall portions 77a and 77a', and a lower wall portion 77c connected at its opposite side ends to the lower ends of the side wall portions 77a and 77a' and facing the lower wall 75 of the air duct 72. A pair of trunnions 78 and 78' extend in axial alignment with each other and project sidewise outwardly from the side portions 77a and 77a' of the louver frame 77 so as to be rotatably supported on the side walls 73 and 73' of the air duct 72, respectively. The louver frame 77 can thus be rotatable about an axis fixed with respect to the air duct 72, substantially parallel with and spaced apart from the upper and lower walls 74 and 75 of the air duct 72 and axially coincident with respective center axes of the trunnions 78 and 78'. The louver assembly 76 further comprises a plurality of horizontal fixed slats 80 integrally connected at the side ends thereof to the side wall portions 77a and 77a' of the louver frame 77 substantially in parallel to and at spacings from the upper and lower wall portions 77b and 77c of the louver frame 77, and a plurality of vertical turnable fins 81 each having a plurality of fin sections which are connected together by bridge portions 81a spacedly formed along the longitudinal direction of the turnable fin 81. Each of the fins 81 further has upper and lower protrusions 81b and 81b' formed at the upper and lower ends of the fin. The upper and lower protrusions 81b and 81b' are pivotally received in holes 77d and 77d' formed in the upper and lower wall portions 77b and 77c, respectively of the louver frame 77. The bridge portions 81a are turnably passed through bores 80a formed in the fixed slats 80 of the louver frame 77, with the result that the turnable fins 81 are supported on the upper and lower wall portions 77b and 77c of the louver frame 77 and the fixed slats 80 and are turnable with respect to the louver frame 77 about axes substantially normal to the horizontal fixed slats 80. The turnable fins 81 have formed at their rear ends spherical joint portions 82 slidably received in a horizontal connecting rod 83 which thus connects the fins 81 together, and a handle 84 is integrally formed at the foremost end of the longitudinally intermediate fin section of one of the vertical turnable fins 81. When the particular one of the turnable fins 81 is turned by the handle 84, all the turnable fins 81 are simultaneously turned with respect to the louver frame 77 about the axes substantially normal to the horizontal fixed slats 80 by means of the horizontal connecting rod 83. The fixed slats 80 and the turnable fins 81 define in combination a plurality of compartments 85 through which a flow of air is to pass.

The ventilation grille structure 71 further comprises air guide means which is operative to guide a flow of air into the individual compartments 85 formed by the fixed slats 80 and the turnable fins 81 without causing turbulences in the air duct 72 in the vicinity of the louver assembly 76. The air guide means is shown comprising upper and lower air guide plates 86 and 87 which respectively have widths substantially equal to the widths of the upper and lower wall portions 77b and 77c of the louver frame 77. The louver assembly 76 and the upper and lower air guide plates 86 and 87 are integral with each other and constructed of a synthetic resin forming a pair of thinned, pliable strip portions 88 and 89 between the upper air guide plate 86 and the upper wall portion 77b of the louver frame 77 and between the lower air guide plate 87 and the lower wall portion 77c of the louver frame 77. It is thus to be noted that the upper air guide plate 86 is hingedly connected at one longitidinal end thereof to the upper wall portion 77b of the louver frame 77 by the strip portion 88, while the lower air guide plate 87 is hingedly connected at one longitudinal end thereof to the lower wall portion 77c of the louver frame 77 by the strip portion 89.

The ventilation grille structure 71 further comprises contact-holding means which is operative to hold the upper and lower air guide plates 86 and 87 in slidable contact at their other longitudinal ends with respective inner faces of the upper and lower walls 74 and 75 of the air duct 72. The contact-holding means comprises an upper biasing member 91 connected at one end to the upper wall portion 77b of the louver frame 77 and at the other end to the upper air guide plate 86 for elastically urging the other end of the upper air guide plate 86 into slidable contact with the upper wall 74 of the air duct 72, and a lower biasing member 92 connected at one end to the lower wall portion 77c of the louver frame 77 and at the other end to the lower air guide plate 87 for elastically urging the other end of the lower air guide plate 87 into slidable contact with the lower wall 75 of the air duct 72. Each of the biasing members 91 and 92 above-mentioned may be constituted by a coil spring. An operating lever 93 extends throughout one of the compartments 85 formed by the fixed slats 80 and the turnable fins 81 and is pivotally connected at one end thereof through a pivotal pin 94 to a bracket 95 securely mounted on the upper air guide plate 86. The longitudinally intermediate portion of the operating lever 93 is formed with a hook 96 which is engageable with the foremost edge of the upper wall portion 77b of the louver frame 77 so as to maintain the upper air guide plate 86 in an angular position where the louver assembly 76 is closed by the upper air guide plate 86. The hook 96 may be substituted by a hook which is arranged in such a manner as to be engageable with the foremost end of one of the fixed slats 80. The operating lever may be pivotally connected at one end thereof to a bracket securely mounted on the lower air guide plate 87 so as to maintain the lower air guide plate in an angular position where the louver assembly 76 is closed by the lower air guide plate 87.

In this embodiment of the ventilation grille structure 71 according to the present invention, an air flow admitted into the air duct 72 can be forced to change its direction in the louver assembly 76 by inclining the louver assembly 76 at an appropriate angle from its upright position and by manipulating the handle 84 for turning the turnable fins 81 through an appropriate angle. In this instance, the air flow is guided and directed by the upper and lower air guide plates 86 and 87 into the compartments 85 without producing turbulences in the air duct 72 in the vicinity of the louver assembly 76.

Figure 11:
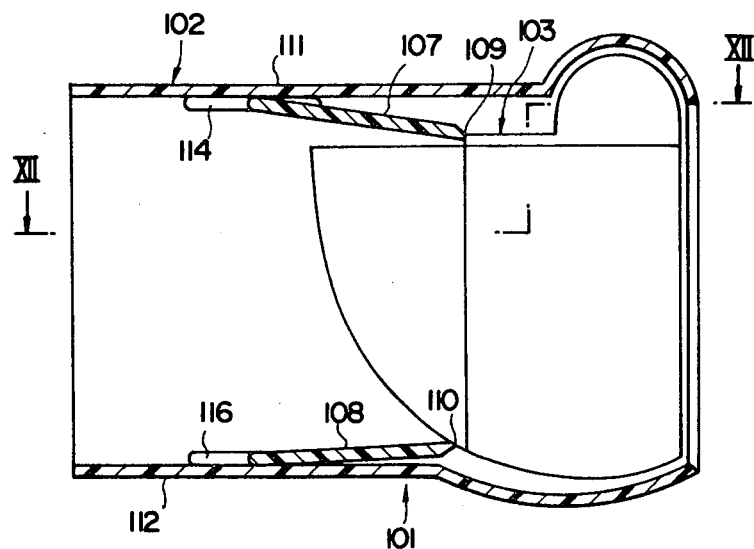
FIG. 11 is a cross sectional view of a third embodiment of the ventilation grille structure according to the present invention.
Figure 12:
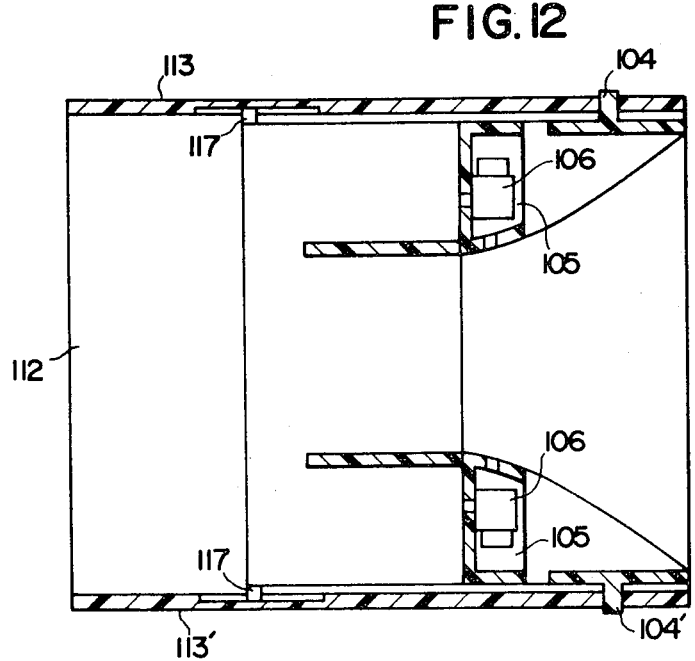
FIG. 12 is a cross sectional view of the ventilation grille structure illustrated in FIG. 11 and taken along line XII—XII of FIG. 11.

The third embodiment of the ventilation grille structure according to the present invention is shown in FIGS. 11 and 12 and is generally indicated by reference numeral 101. The ventilation grille structure 101 comprises an air duct 102 and a fluidic element type direction control assembly 103 which is disposed in the air duct 102. The direction control assembly 103 is corresponding to and achieves the same functions as the louver assemblies 46 and 76 of the first and second embodiments of the ventilation grille structure. The direction control assembly 103 is pivotally supported through pivotal pins 104 and 104' on the air outlet end portion of the air duct 102, and is formed in a generally bell-mouth shape for directing the air flow. The direction control assembly 103 has a pair of air conduits 105 opposingly disposed and each opening at one end to the internal passageway of the air duct 102 and at the other end to the internal passageway of the direction control assembly 103. A pair of solenoid operated valves 106 are provided in the air conduits 105, respectively, so as to open or close the air conduits 105. It is therefore to be understood that the air flow is forced to change its direction when one of the air conduits 105 is closed by one of the solenoid operated valves 106 while the air flow is passing through the direction control assembly 103. Similar to the first and second embodiments of the ventilation grille structure, the third embodiment of the ventilation grille structure according to the present invention further comprises air guide means which is operative to guide a flow of air into the internal passageway of the direction control assembly 103 without causing turbulences in the air duct 102 in the vicinity of the direction control assembly 103. The air guide means is shown comprising upper and lower air guide plates 107 and 108 which respectively have widths substantially equal to the widths of the upper and lower portions of direction control assembly 103. The direction control assembly 103 and the upper and lower air guide plates 107 and 108 are integral with each other and constructed of a synthetic resin forming a pair of thinned, pliable strip portions 109 and 110 between the upper air guide plate 107 and the upper protion of direction control assembly 103 and between the lower air guide plate 108 and the lower portion of the direction control assembly 103. It is thus to be noted that the upper air guide plate 107 is hingedly connected at one longitudinal end thereof to the upper portion of the direction control assembly 103 by the strip portion 109, while the lower air guide plate 108 is hingedly connected at one longitudinal end thereof to the lower portion of the direction control assembly 103 by the strip portion 110.

The ventilation grille structure 101 further comprises contact-holding means which is operative to hold the upper and lower air guide plates 107 and 108 in slidable contact at their other longitudinal ends with the respective inner faces of upper and lower walls 111 and 112 of the air duct 102. The contact-holding means comprises portions of the side walls 113 and 113' which are formed with a pair of upper guide grooves 114 extending longitudinally of the air duct 102 and having respective upper ends substantially flush with the inner face of the upper wall 111 of the air duct 102, and a pair of guide pins sidewise outwardly projecting in opposite directions from the longitudinal ends of the upper air guide plate 107 and slidably received in the upper guide grooves 114, respectively. The contact-holding means further comprises portions of the side walls 113 and 113' which are similarly formed with a pair of lower guide grooves 116 extending longitudinally of the air duct 102 and having respective lower ends substantially flush with the inner face of the lower wall 112 of the air duct 102, and a pair of lower guide pins 117 sidewise outwardly projecting in opposite directions from the longitudinal ends of the lower air guide plate 108 and slidably received in the lower guide grooves 116, respectively.

Although particular embodiments of the present invention have been shown and described, it will be obvious to those skilled in the art that various changes and modifications may be made without departing from the spirit and scope of the present invention.

What is claimed is:

1. A ventilation grille structure, comprising:
   an air duct for directing an air flow therethrough, and having a pair of spaced parallel side walls, an upper wall connected at its opposite side ends to the upper ends of said side walls, and a lower wall connected at its opposite side ends to the lower ends of said side walls, said side walls and said upper and lower walls forming in combination said air duct having a substantially rectangular internal cross section;
   a louver assembly comprising a louver frame having a pair of side wall portions facing said side walls of said air duct and rotatable about an axis fixed with respect to said air duct and substantially parallel with and spaced apart from said upper and lower walls of said air duct, an upper wall portion connected at its opposite side ends to the upper ends of said side wall portions and facing said upper wall of said air duct and a lower wall portion connected at its opposite side ends to the lower ends of said side wall portions and facing said lower wall of said air duct;
   air guide means comprising upper and lower air guide plates respectively having widths substantially equal to the widths of said upper and lower wall portions of said louver frame, said upper air guide plate having one longitudinal end hingedly connected to said upper wall portion of said louver frame and said lower air guide plate having one longitudinal end hingedly connected to said lower wall portion of said louver frame; and
   contact-holding means comprising portions of said side walls which are formed with a pair of upper guide grooves extending longitudinally of said air duct and having respective upper ends substantially flush with the inner face of said upper wall of said air duct, portions of said side walls which are formed with a pair of lower guide grooves extending longitudinally of said air duct and having respective lower ends substantially flush with the inner face of said lower wall of said air duct, a pair of upper guide pins sidewise outwardly projecting in opposite directions from the longitudinal ends of said upper air guide plate and slidably received in said upper guide grooves, respectively, and a pair of lower guide pins sidewise outwardly projecting in opposite directions from the longitudinal ends of said lower air guide plate and slidably received in said lower guide grooves, respectively.

* * * * *